(12) United States Patent
Tomonaga et al.

(10) Patent No.: US 6,813,697 B1
(45) Date of Patent: Nov. 2, 2004

(54) DATA PROCESSOR AND DATA PROCESSING SYSTEM

(75) Inventors: Kazuhiro Tomonaga, Tachikawa (JP); Katsumi Iwata, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 539 days.

(21) Appl. No.: 09/679,349

(22) Filed: Oct. 5, 2000

(30) Foreign Application Priority Data

Oct. 28, 1999 (JP) .......................................... 11-306328

(51) Int. Cl.$^7$ .............................................. C06F 12/00
(52) U.S. Cl. ........................... 711/170; 711/2; 711/153; 711/163; 711/173; 711/212
(58) Field of Search ............................. 711/2, 153, 163, 711/173, 212, 170

(56) References Cited

U.S. PATENT DOCUMENTS 5,966,728 A * 10/1999 Amini et al. ................ 711/146
6,012,128 A * 1/2000 Birns et al. .................. 711/163

* cited by examiner

*Primary Examiner*—Donald Sparks
*Assistant Examiner*—Bao Q Truong
(74) *Attorney, Agent, or Firm*—Mattingly, Stanger & Malur, P.C.

(57) ABSTRACT

A data processor includes the normal mode providing narrow access space of CPU and the advance mode providing wide access space. Even in the normal mode, the transfer control section assures data transfer control exceeding the address range for access from CPU. Even when programs are generated exceeding the limit of program capacity for the access range of CPU in the normal mode, if the programs exceeding such limit are stored in the non-access area of ROM 6 in the normal mode, the transfer control section accesses such programs and transfers these programs to RAM. Thereby CPU in the normal mode can use such programs transferred to RAM by making access thereto. Accordingly, limit of program capacity can be alleviated, while maintaining good program execution efficiency in the rather small access space of CPU in the data processor.

15 Claims, 10 Drawing Sheets

TRANSFER OF BUILT-IN ROM TO THE BUILT-IN RAM

USED AS EXTERNAL MEMORY

DATA PROCESSOR AND DATA PROCESSING SYSTEM

BACKGROUND OF THE INVENTION

1. Field of the Invention

The present invention relates to a data processor that can change over the address space depending on an operation mode and to, for example, a technique to be adequately applicable to a microcomputer.

2. Description of the Related Art

A certain microcomputer is loading a CPU (Central Processing Unit) having the operation modes in different address spaces as the access objects. For example, the Hitachi single chip microcomputer H8S/2148 and H8S/2144 series microcomputer manufactured by Hitachi, Ltd. have a couple of operation modes of the normal mode where the address space supported by CPU is 64 k-byte and the advanced mode of the 16 M-byte. Since difference of address space appears as a difference in the number of bits of the address information, the instruction code becomes short and program capacity can be reduced when the programming is made for the normal mode as in the case where the programming is performed for the advanced mode. Moreover, when the process is performed in the normal mode, the number of execution states can be reduced and the data processing operation is performed at a higher speed.

SUMMARY OF THE INVENTION

Since it is impossible to access to the address space exceeding 64 k-byte in the normal mode, there is a limitation that program and data capacity must be reduced. However, in some cases, it is difficult to satisfy the limitation of 64 k-byte for the tendency to realize high performance or complication of the microcomputer applied system. In this case, when the operation mode to operate in the 16 M-byte is selected, the merits of the operation mode to use the comparatively small address space such as 64 k-byte are decreased.

It is therefore an object of the present invention to provide a data processor that has relatively small access space of CPU and can improve convenience in the operation mode assuring higher efficiency of program.

It is another object of the present invention to provide a data processor that can alleviate limitation of program capacity while maintaining good execution efficiency of program with the comparatively small access space of CPU.

It is still another object of the present invention to provide a data processing system that can reduce the physical size of circuits and maintains good data processing efficiency in order to overcome the problems of high performance of program process and complication of the process.

The abovementioned objects and the other objects of the present invention will become apparent from description of the present specifications and accompanying drawings.

The typical inventions of the present invention will be explained briefly below.

[1] The data processor according to the first point of view of the present invention is capable of selectively setting a first or second mode and includes a processing section such as CPU, a memory section such as a built-in memory and a register or the like, and a transfer control section such as a direct memory access controller or a data transfer controller. This data processor is formed, for example, in one semiconductor chip. The data processor is capable, in the first mode, of accessing to the entire part of the memory by making access using an address signal that can be expressed with the number of the first bits and is also capable, in the second mode, of accessing to the first area as a part of the memory by making access using the address signal that can be expressed with the number of the second bits less than the number of first bits. The transfer control section is capable of executing the transfer control of information using the address signal that can be expressed with the number of first bits even in the second mode.

According to above explanation, even in the second operation mode, the data transfer control section can execute the data transfer control exceeding the address range that may be accessed with CPU. Namely, the transfer control section in the second mode controllably transfers the information to the other second areas from the first area of the memory in the address space that can be accessed with the address signal expressed with the number of first bits or controllably transfers the information stored in the second area to the first area.

Thereby, for example, even if a program or the like is generated exceeding the limit of program capacity for the accessible range of CPU in the second mode, when the program or the like exceeding such limitation is stored in the storage area other than the first area, CPU cannot make direct access to the program stored in the memory other than the first area. However, the transfer control section can make access to the program to transfer it to the first area, and CPU in the second mode can use the program transferred to the first area by accessing thereto. Accordingly, it is possible to alleviate the limitation of the program capacity while maintaining good execution efficiency of the program with the rather small access space of CPU.

[2] In the second mode, the transfer control section can select execution of transfer control of information using the address signal expressed with the number of first bits or execution of the transfer control of information using the address signal expressed with the number of second bits by further providing a control register means that can take the first or second condition. The transfer control section is allowed in the second mode to execute the first transfer control using the address signal expressed with the number of first bits in response to the first condition of the control register means and is also allowed to execute the second transfer control using the address signal expressed with the number of second bits in response to the second condition of the control register means.

For instance, in the second mode, the first transfer control enables the access to entire part of the memory, while the second transfer control enables the access to the first area of the memory.

When the second condition of the register means is selected, the CPU and the transfer control section access, in the second mode, the same address space to realize the operation mode similar to that of the data processor of the related art. Therefore, the existing operation program operated in such a condition is assured to execute in direct and compatibility for the data processor of the related art can be attained.

[3] To the first area, the transfer control information area wherein the transfer control information including the transfer source and destination address information for the transfer control by the transfer control section can be set in a plurality of sets with the data processor can be assigned, and the transfer control section may introduce the structure for reading transfer control information from the transfer control information area by receiving the drive instruction of the data transfer operation and to execute the transfer control depending on the transfer control information obtained by the reading operation.

When the data processor is provided with an external bus interface circuit to realize the bus interface with external circuit and the external circuit connected to the external bus interface circuit is assigned to the second area, the transfer control section in the second mode is capable of using CPU by transferring the data or program of external circuit not accessed from CPU to the first area of the memory.

When the data processor is provided with an input/output peripheral circuit that can interface with external circuits and this input/output peripheral circuit is provided with an I/O register arranged in the first area, the transfer control section transfers, in the second mode, the data of the second area no accessed from CPU to the I/O register in the first area and when CPU controls the input/output operation of the input/output peripheral circuit, the data in the second area can be communicated with the external circuit via the peripheral circuit.

[4] The memory can be formed by comprising ROM laid on the first and second areas, RAM included in the first area and the peripheral I/O register.

In this case, an electrically programmable flash memory may be used as ROM. When the program is stored in the flash memory, program correction for overcoming bug and update of program for version-up are enabled. When the update control is performed by the data processor, it is enough to store the update control program to be executed by the data processor in the second area of flash memory. At the time of updating, CPU in the second mode initially sets the transfer condition to the transfer control section and thereafter the transfer control section transfers the update control program in the second area and CPU controls update of the flash memory by executing such update control program.

[5] The data processing system from the second point of view of the present invention includes a data processor and a first external device. The data processor includes, for example, in the semiconductor chip, a data processor like CPU, a memory, a transfer control section and an external bus interface circuit connected to the first external device via the external bus and is capable of selectively setting the first mode or second mode. The data processor can access to the entire part of the memory by making access in the first mode using the address signal expressed with the number of first bits, while can access in the second mode to a part of the memory by making access using the address signal expressed with the number of second bits less than the number of first bits. The transfer control section is capable, even in the second mode, the transfer control of information using the address signal expressed with the number of first bits. The first external device connected to the external bus interface circuit is assigned to the second area other than the first area in the address space to be accessed using the address signal expressed with the number of first bits.

According to this data processing system, the transfer control section transfers, in the second mode, the data or program between the first external device not accessed from CPU and the first area of the memory.

The data processing system is also capable of providing a second external device. Namely, the data processor is further provided with the input/output peripheral circuit that can interface with external circuits, and the input/output peripheral circuit includes an I/O register arranged in the first area and the second external device for transmitting and receiving data to and from the I/O register is connected to the data processor. According to this structure, the transfer control section transfers, in the second mode, the data of the second area not accessed from CPU to the I/O register, and when CPU controls the input/output operation of the input/output peripheral circuit, the data in the second area can be communicated with the second external device via the input/output peripheral circuit. Moreover, in the second mode, the data can be transferred virtually between the first external device on the second area and the second external device in the second mode.

According to the data processing system explained above, it contributes to reduction of physical circuit scale in such a point that the memory of the data processor can be used effectively in the second mode and also can alleviate limitation of program capacity to realize high performance and provide a measure for complication, while maintaining good data processing efficiency by the second mode.

[6] The data processing system from the third point of view of the present invention includes the first data processor and second data processor that are respectively capable of making access to the memory and are connected to the common bus. The first data processor includes, for example, on the semiconductor chip, a data processor such as CPU, a memory, a transfer control section to selectively set the first mode or second mode. The data processor can access to the entire part of the memory by making access using the address signal expressed with the number of first bits in the first mode and also can access to the first area as a part of the memory by making access using the address signal expressed with the number of second bits that is less than the number of first bits in the second mode. The transfer control section can execute the transfer control of information using the address signal expressed with the number of first bits even in the second mode. In the second mode, the data processor assigns the third area included in the area (second area) other than the first area of the memory to the storage area of the second data processor in response to the first request from the second data processor and causes, in response to the second request from the second data processor, the data transfer control section to transfer the information supplied from the second data processor to the third area and also causes, in response to the third request from the second data processor, the data transfer control section to transfer the information to the second data processor from the third area.

The process responding to the first request is performed to obtain correspondence between the address of the memory built in the first data processor and the access address by the second data processor. Thereafter, when the second request such as the predetermined memory write access by the second data processor is issued, the data processor, for example, converts the write address to the address of the third area with reference to the information about correspondence explained above and then sets this address as one of the transfer condition to the transfer control section and causes the transfer control section to transfer the write data to the third area in the timing synchronized with the write access cycle of the second data processor. Moreover, when the third request such as the predetermined memory read access by the second data processor is issued, the data processor, for example, converts the read address to the address of the third area with reference to the information about correspondence explained above and causes the transfer control section to set this address as one of the transfer conditions and also causes the transfer control section to transfer the data to the second data processor from the third area in the timing synchronized with the read access cycle of the second data processor.

Thereby, in the second mode of the first data processor, the entire part or a part (third area) of the memory belonging to the second area as the non-access object memory by the built-in CPU of the first data processor can be used as the memory of the second data processor.

The information used by the first data processor is stored in the part other than the third area among the second area of the memory or the data used by the data processor can also be transferred to the first area from the part other than the third area of the second area of the memory.

In above explanation, the data processor converts the write address and read address to the address of the third area with reference to the correspondence relationship, but, on the contrary, it is also allowed that the second data processor converts the address to supply the address to the first data processor. In this case, it is enough that the transfer control section uses, in direct, the address signal supplied for the setting of the transfer control section.

The data processing system explained above can effectively use the memory built in the data processor in the second mode of the first data processor and moreover contributes to reduction of the physical circuit size of the data processing system in such a point that the memory built in the first data processor can be used in the second mode as the memory of the second data processor and also alleviates limitation of program capacity to realize higher performance of program process or take a measure for complication, while maintaining good data processing efficiency by the second mode.

DESCRIPTION OF THE PREFERRED EMBODIMENTS

Summary of the Microcomputer

Figure 1:
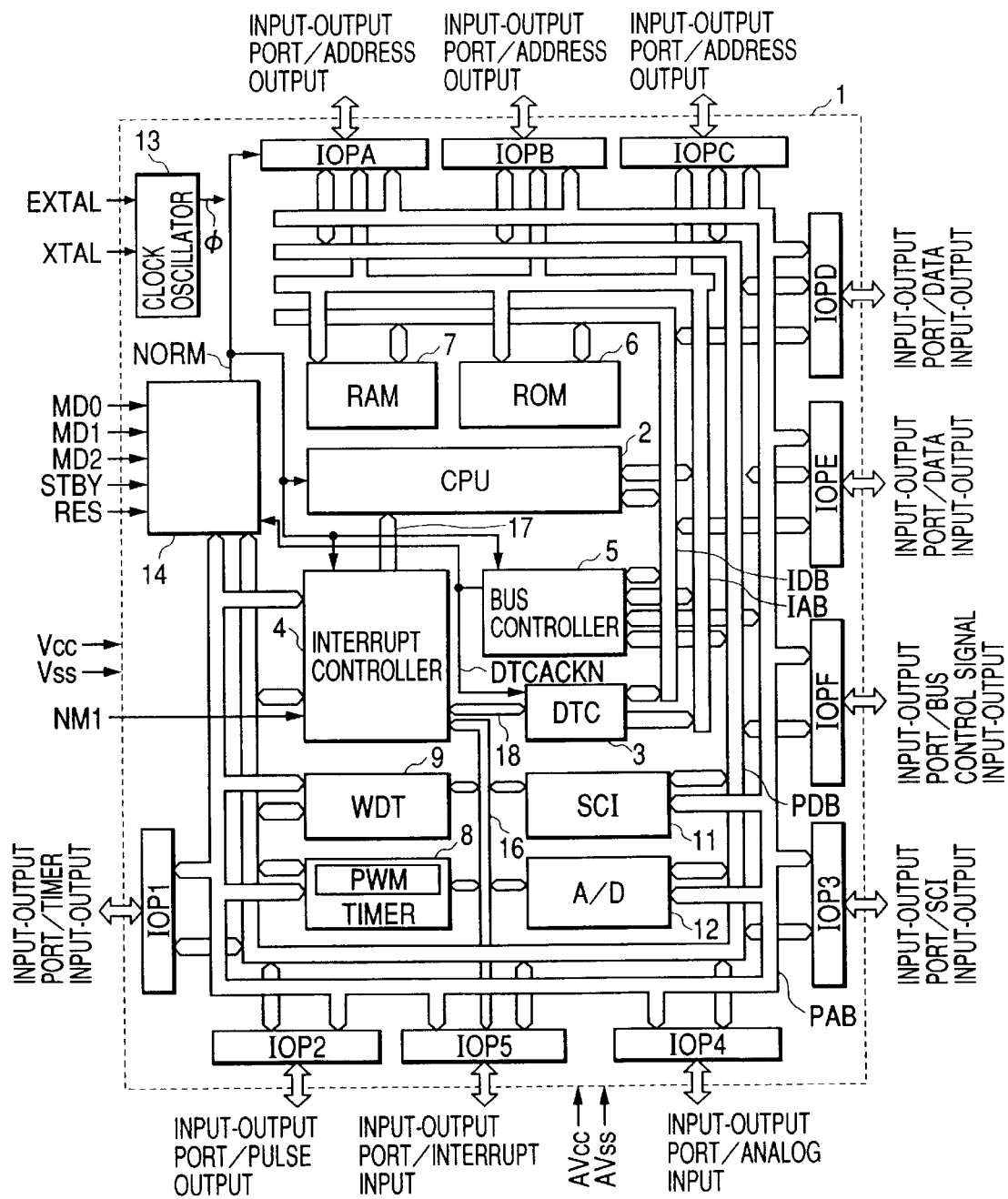
FIG. 1 is a block diagram of a single chip microcomputer as an example of the data processor of the present invention.

FIG. 1 illustrates a single chip microcomputer (hereinafter referred to as microcomputer) as an example of the data processor of the present invention.

The single chip microcomputer 1 is comprised of a CPU 2 as the data processor for the control of entire part, a data transfer controller (DTC) 3 as the transfer control section, an interruption controller (INT) 4, a bus controller 5, a ROM 6 as the memory for storing the processing program of CPU 2, a RAM 7 as the working area of CPU and memory for temporarily storing the data, a timer 8, a watch dog timer 9, a serial communication interface (SCI) 11 as the input/output peripheral circuit, an A/D converter 12 as the input/output peripheral circuit, input/output ports IOP1 to IOP5, input/output ports IOPA to IOPF as the external bus interface circuit, a clock oscillator (CPG) 13 and a system controller 14 and is formed on one semiconductor substrate (semiconductor chip) through the well known semiconductor manufacturing technique.

The microcomputer 1 explained above has the input terminal, as the power supply terminal, for ground level Vss, power source voltage level Vcc, analog ground level Avss, analog power source voltage level Avcc and also has, as the exclusive control terminals, the reset terminal RES, standby terminal STBY, mode terminals MD0 to MD2 and clock input terminals EXTAL, XTAL.

Based on the crystal-controlled oscillator connected to the terminals EXTAL, XTAL of CPG 13 and external clock signal input to the EXTAL terminal, CPG 13 generates the reference clock signal (system clock signal) φ. Each function block of the single chip microcomputer 1 operates in synchronization with the reference clock signal φ.

The function blocks of the single chip microcomputer 1 are mutually connected with the internal bus. The internal bus includes, in addition to the address bus and data bus, the control bus for transferring the read signal, write signal, bus size signal or system clock signal, etc. The internal data bus, although not particularly restricted, is of the 16-bit structure and at least ROM 6 and CPU 7 are interfaced with the 16-bit bus. Although not particularly restricted, RAM 7 is also interfaced with the 16-bit bus. The internal address bus includes two kinds of IAB and PAB and the internal data bus also includes two kinds of IDB and PDB. IAB and PAB, IDB and PDB are buffered with the bus controller 5.

The functions blocks and modules explained above are controlled with CPU 2 for the read/write operations. The built-in ROM 6 and RAM 7 are interfaced with IAB and IDB and are set ready for read/write operation in one state.

When the reset signal RES is given to the single chip microcomputer 1, CPU 2 and single chip microcomputer 1 are in reset condition. When this reset condition is canceled, CPU 2 reads the start address from the predetermined address to execute the reset exceptional process to start the reading of instruction from this start address. Thereafter, CPU 2 sequentially reads the instructions from ROM 6 and decodes these instructions to execute the arithmetic process on the basis of the decoded contents.

Figure 2:
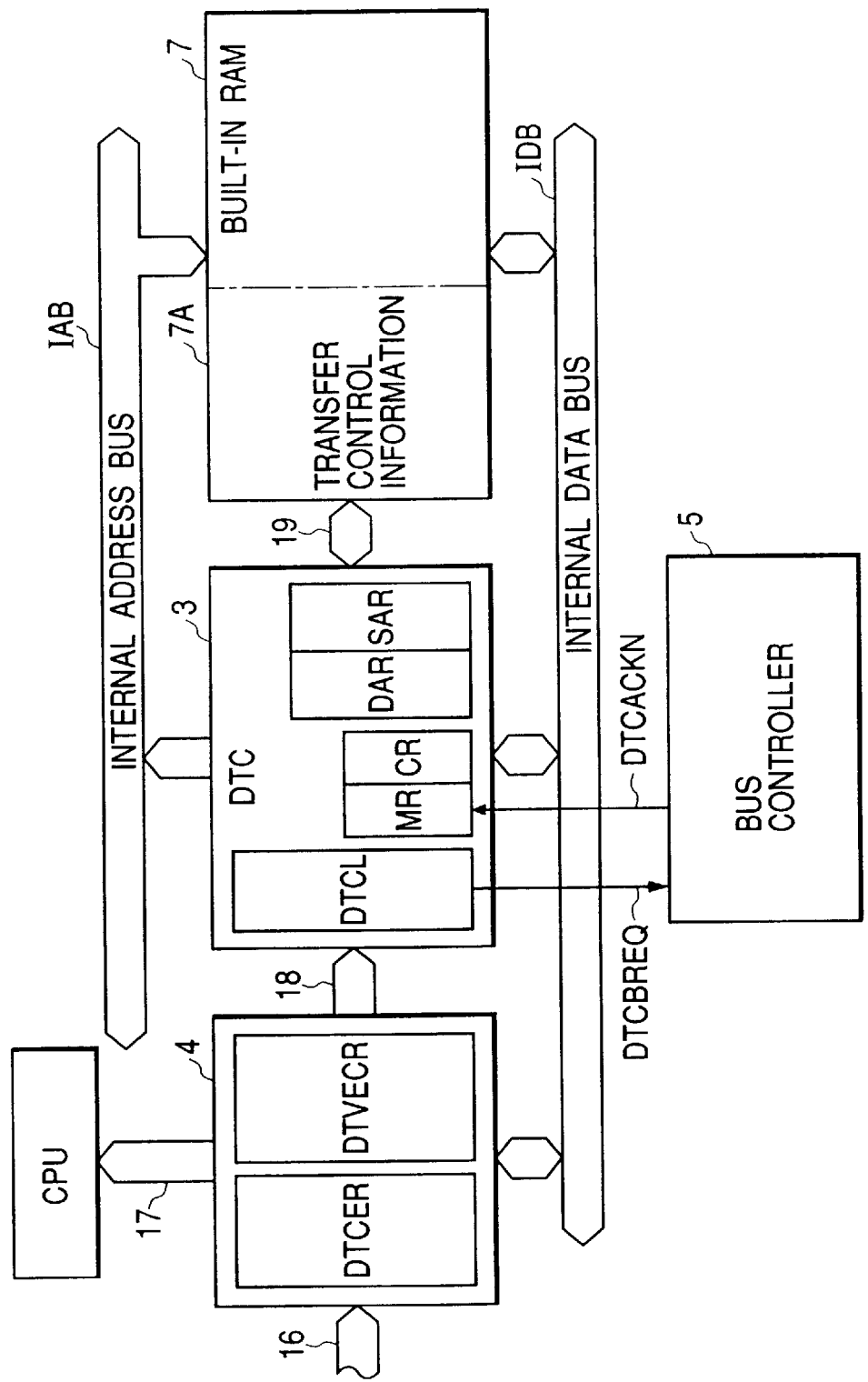
FIG. 2 is a block diagram of DTC focused on the relationship between the interruption controller and bus controller.

As illustrated in FIG. 2, DTC 3 is given the DTC start request and DTC vector No. 18 from the interruption controller 4. When the DTC start request and DTC vector No. 18 are given, DTC 3 requests the bus right to the bus controller 5 with DTC bus request DTCBREQ. After obtaining the bus right with DTC acknowledge signal DTCACKN, DTC 3 reads the DTC vector of the vector number, reads the data transfer control information of the transfer control information area 7A on RAM 7 indicated by the DTC vector and starts the data transfer control based on such information obtained.

DTC 3 includes, as the transfer control register for loading the data transfer control information obtained, the mode register MR, transfer count register CR, destination address register DAR and source address register SAR. To the mode register MR, the information for determining whether the data transfer size is byte or word, whether the source address or destination address is incremented or decremented after data transfer and whether the data transfer is performed in unit of block or repeated or completed in once, etc. The transfer count register CR sequentially counts up the number of words to be transferred. The destination address register DAR holds the transfer destination address. These transfer control registers are also allowed to load the control information in direct from CPU 2 but the transfer control information for a plurality of transfer channels on RAM 7 can be loaded to the transfer control register only within one cycle in unit of one transfer channel via the exclusive bus 19 (illustrated in FIG. 2). The data transfer control with the transfer control information loaded to the transfer control register is carried out with the control logic DTCL.

The interruption controller 4 controls the interruption request to CPU 2 and start request to DTC 3. The interruption signal 16 as the interruption factor is supplied to the interruption controller 4 from the A/D converter 12, timer 8, watch dog timer 9, SCI 11 and input/output ports IOP 5. Moreover, the DTC enable register DTCER is provided to determine whether DTC start request or CPU interruption request should be issued for each interruption factor of the interruption signal 16. For each interruption factor, the interruption vector and DTC start vector are previously determined. The interruption vector holds the leading address of the interruption processing program in response to the interruption factor. The DTC start vector holds the leading address of the storage area storing the data transfer control information in response to the interruption factor.

When interruption is requested with the interruption signal 16 to the interruption controller 4 from the interruption factor source set as the CPU interruption request to the DTC enable register DTCER, the interruption controller 4 determines whether the interruption request should be accepted or not on the basis of the interruption priority level or interruption mask level. When it is determined that the interruption should be accepted, the interruption vector number depending on the interruption factor is output and the interruption request signal 17 is given to CPU 2. Thereby, CPU 2 intermits the process being executed and branches to the predetermined process routine in response to the interruption factor based on the vector of interruption vector number in order to execute the desired process.

When the interruption is requested with the interruption signal 16 to the interruption control 4 from the interruption factor source (DTC start factor source) set as the DTC start request in the DTC enable register TDCER, the interruption controller 4 accepts the interruption request depending on the specified priority sequence and gives, to DTC 3, the vector number of the DTC start vector and DTC start request signal 18 depending on the relevant interruption factor. Thereby, DTC 3 requests the bus right to the bus controller 5 and reads, when the bus right is recognized with the DTC acknowledge signal DTCACKN, the data transfer control information of the corresponding data transfer channel from the address indicated with the DTC start vector to start the data transfer control depending on the data transfer control information obtained.

Moreover, the interruption controller 4 includes the DTC vector register DTVECR to enable start of software of DTC 3. Like the generation of the DTC start request by interruption, DTC 3 can be started with the DTC start request signal and DTC start vector No. 18 by setting the enable bit of DTC vector register DTVECR to logical value "1" with CPU 2. In this case, the DTC start vector is designated with the vector number set to the relevant register DTCVECR.

The microcomputer 1 has at least the advance mode (first mode) and normal mode (second mode). The operation mode is determined by the conditions of the mode terminals MD0 to MD2.

Figure 3:
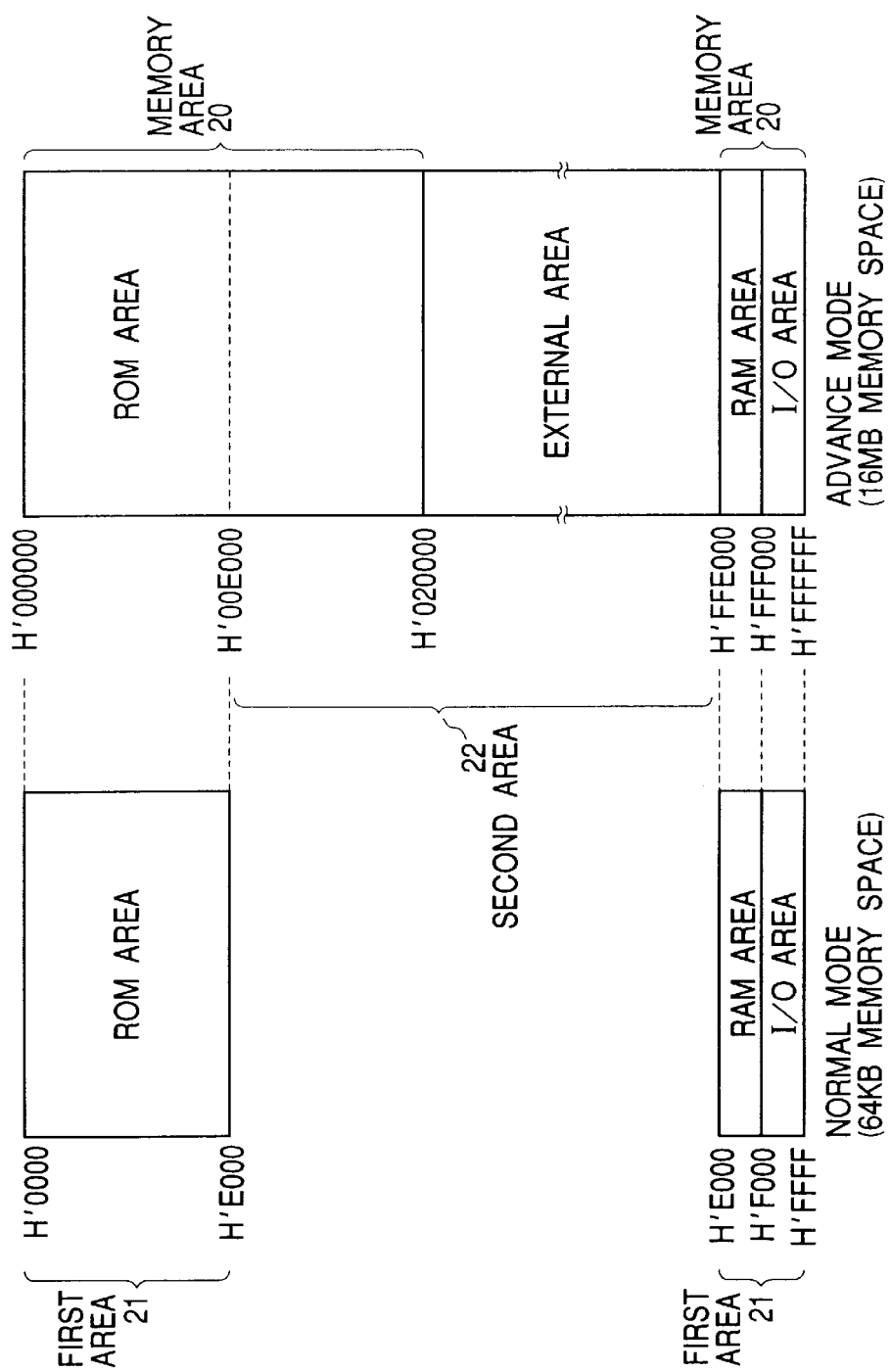
FIG. 3 is an address map indicating the address space of CPU in the advance mode and normal mode.

FIG. 3 illustrates the address space of CPU in the advance mode and normal mode. In the advance mode, CPU 2 can access to the address space (H' 000000 to H' FFFFFF) of 16-Mbyte expressed, for example, with the 24-bit address signal. In the address space of 16-Mbyte, all storage area of ROM 6 is mapped to the ROM address area (H' 000000 to H' 01FFFF), external address space of the microcomputer 1 is mapped to the external address area (H' 020000 to H' FFDFFF), all storage areas of RAM 7 are mapped to the RAM address area (H' FFE000 to H' FFEFFF) and the interruption controller 4, WDT 9, timer 8, SCI 11, A/D 12, DTC 3 and registers (I/O register) of input/output port are mapped to the I/O address area (H' FFF000 to H' FFFFFF).

In the normal mode, CPU 2 can access the 64k-byte address space (H' 0000 to H' FFFF) expressed, for example, with the 16-bit address signal. In the 64-kbyte address space, a part of the storage area of ROM 6 is mapped to the ROM address area (H' 0000 to H' DFFF), all storage areas of RAM 7 are mapped to the RAM address area (H' E000 to H' EFFF), and the I/O register is mapped to the I/O address area (H' F000 to H' FFFF), disabling access to the external address area.

Here, the circuits such as ROM and RAM mapped to the address area other than the external area in the 16-Mbyte address space can be considered as the memory 20 of the microcomputer 2. The physical storage area (memory cell array and register, etc.) of the circuit mapped to the 64-kbyte address space of the memory 20 is called the first area 21. The circuit region other than the first area of the circuit mapped to the 16-Mbyte address space is generally called the second area 22.

DTC Expansion Mode in the Normal Mode

Here, based on the existing concept, the address space of the other built-in bus master such as DTC 3 or the like is matched with the address space of CPU 2 in the normal mode and advance mode. On the other hand, in the microcomputer 1, if the normal mode is set, DTC 3 can be operated as the data transfer object even at the second area 22. This operation mode is conveniently called the DTC expansion mode in the normal mode. Therefore, in the DTC expansion mode of the normal mode, DTC 3 can execute the data transfer control in the same address range as that in the advance mode.

In order to realize the address mapping of FIG. 3 in the normal mode and advance mode and the DTC expansion mode in the normal mode, the system controller 1 generates the control signal NORM as illustrated in FIG. 1 and then supplies this control signal NORM to the CPU2, interruption controller 4, bus controller 5 and input/output port IOPA to which the address output functions of the host 1 side are assigned.

The control signal NORM is set to the logical value "0" in the DTC expansion mode in the advance mode and normal mode and is set to the logical value "1" in the other normal mode.

The input/output port IOPA to which the address output function of the byte in the host 1 side is set to a high output impedance with the logical value "1" of the control signal NORM and the external address signal is set to 16 bits corresponding to the 64-kbyte address space. When the control signal NORM is set to the logical value "0", the input/output port IOPA is capable of outputting the address signal and the external address signal is set to 24-bit corresponding to the 16-Mbyte address space.

The CPU 2 restricts address arithmetic function to validate the lower 16 bits of the effective address with the logical value "1" of the control signal NORM and also adapts the interruption vector table and stack structure to 16-bit address. When the control signal NORM is logical value "0", the address arithmetic function, interruption vector table and stack structure are adapted to 24-bit address.

The bus controller 5 executes the adjustment of bus right and bus control. The bus right adjustment is a control for recognizing the bus right to one party by adjusting the competition for the bus right request from CPU 2 and DTC 3. The bus control is classified into the external bus access control function and internal module selection function. Namely, the bus controller has the address mapping information of the normal mode and advance mode explained in regard to FIG. 3 and generates the internal module selection signal or external bus access strobe signal in response to the area indicated by the address on the address bus IAB depending on the address mapping of the normal mode when the control signal NORM is logical value "1". When the control signal NORM is logical value "0", the bus controller generates the internal module selection signal or external bus section strobe signal in response to the area indicated by the address on the address bus IAB depending on the address mapping of the advance mode. For example, when the address signal of the RAM address area appears on the bus IAB in the normal mode, the module selection signal for selecting operation of RAM 7 is activated to operate RAM 7. When the address signal of external address area appears on the bus IAB in the advance mode, the strobe signal such as write signal and read signal for external bus access and the address signal are output to the external side via the input/output ports IOPA to IOPF to realize the external input or external output of data. In the DTC expansion mode in the normal mode, since the control signal NORM is logical value "0", the bus controller 5 can execute both external bus access control and internal module selection operation to the address area as in the case of the advance mode, and DTC 3 in the DTC expansion mode is capable of executing the data transfer control in the address range or with the address mapping same as that in the advance mode.

Figure 4:
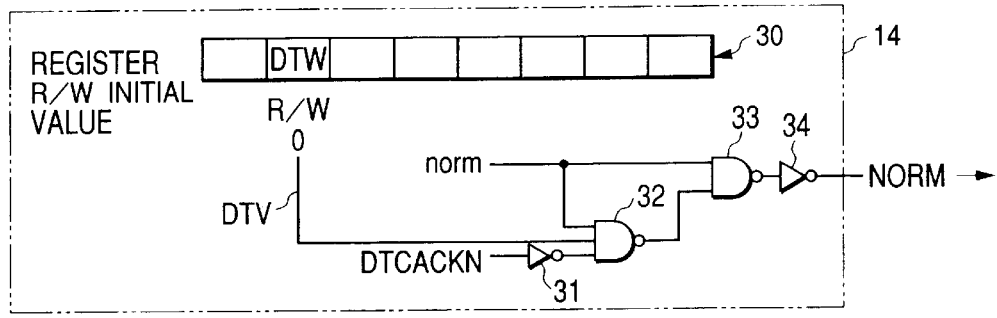
FIG. 4 is a logical circuit diagram illustrating an example of generated logic of the control signal NORM at the inside of the system controller.

FIG. 4 illustrates an example of generation logic the control signal NORM. The signal norm is set to the logical value "1" in response to the instruction of normal mode by the mode terminals MD0 to MD2 and to the logical value "0" in response to the instruction of the advance mode. The control bit DTV is the predetermined one bit of the control register 30 and whether the second area 22 allows or not the DTC expansion mode as the data transfer object by the DTC 3 is determined in the normal mode. The control bit DTV allows the DTC expansion mode with the logical value "1" and inhibits the DTC expansion mode with the logical value "0". The DTC acknowledge signal DTCACKN is output from the bus controller 5 to instruct the DTC 3 that the bus right is given to DTC 3 with the logical value "0". DTC 3 acquires the bus right with the DTC acknowledge signal DTCACKN of the logical value "0" and executes the data transfer control operation that will be explained later.

The DTC acknowledge signal DTCACKN is inverted with an inverter 31 and is then input to the NAND gate 32 together with the control bit DTV and signal norm, an output of this NAND gate 32 is input to the NAND gate 33 together with the signal norm and an output of the NAND gate 33 is inverted with the inverter 24 to generate the control signal NORM. As is apparent from generation logic of the control signal NORM, the control signal NORM is given the same logical value same as that of the signal norm when the DTC acknowledge signal DTCACKN has the logical value "1" (DTC does not yet obtain the bus right) or the control bit DTV has the logical value "0" (DTC expansion mode inhibit condition). Meanwhile, when the microcomputer 1 is in the normal mode (norm=1) and the control bit DTV is logical value "1" (DTC expansion mode allowable condition), the control signal NORM has the logical value "0" when the DTC 3 has obtained the bus right with the logical value "0" of the DTC acknowledge signal DTCACKN, and DTC 3 is capable of controlling the data transfer to the 16-Mbyte address space as in the case of the advance mode.

Figure 5:
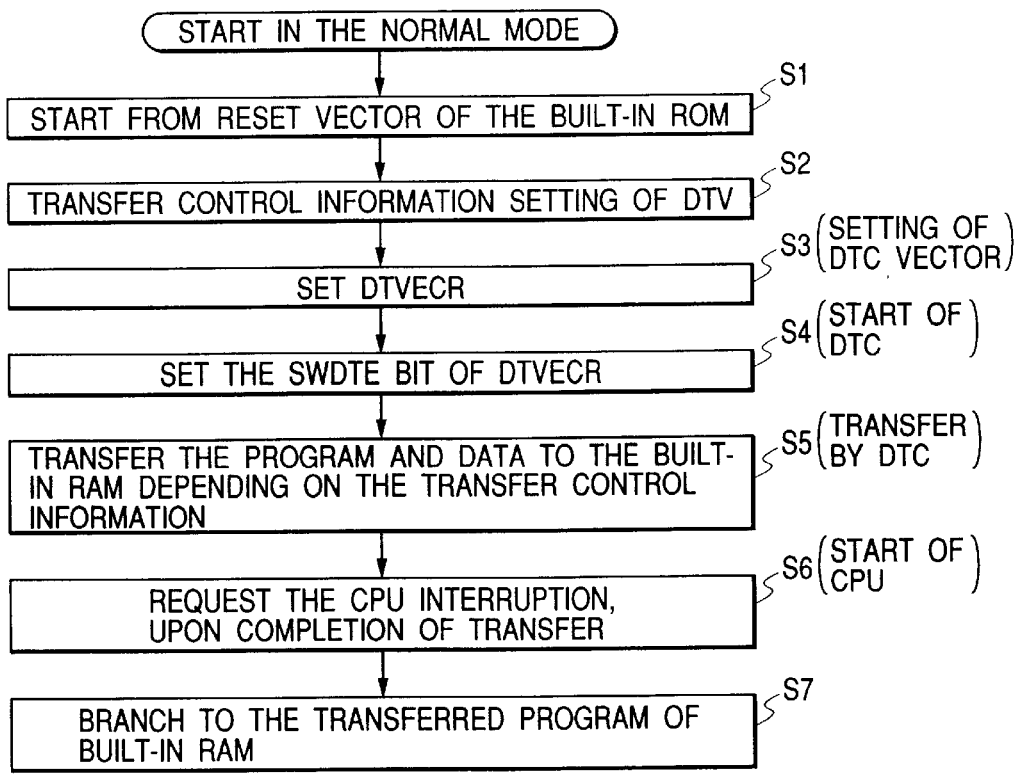
FIG. 5 is a flowchart illustrating an example of operation for transferring the data to RAM from the non-access object area of CPU by starting DTC with the software as the operation for using the DTC expansion mode in the normal mode.

FIG. 5 illustrates a flowchart of operation to use the DTC expansion mode in the normal mode. In an example of this figure, DTC 3 is started with software.

For example, the microcomputer 1 is started in the normal mode. Namely, the normal mode is designated with the mode signals MD0 to MD2 to start CPU 2 from the reset vector stored in ROM 6 (S1). CPU 2 cannot access the second area 22 of ROM 6 in the normal mode. Here, it is assumed that a plurality kinds of program modules and data are stored previously in the manufacturing stage of microcomputer or on the system to the second area 22 of such ROM 6. CPU 2 sets, according to the operation program of ROM 6, the control bit DTV of the control register 30 to the logical value "1" and also sets the desired transfer control information in the predetermined format to the transfer control information area 7A of RAM 7 (S2). Moreover, CPU 2 sets the DTC vector number corresponding to the leading address of the area storing the transfer control information to the register DTVECR (S3) and then sets the enable bit to the register DTVECR (S4). In response to this process, the preset vector number and DTC start request signal 18 are given to DTC 3 from the interruption controller 4, DTC 3 requests the bus right to the bus controller 5 to obtain the bus right and reads the transfer control information from the transfer control information area 7A and also controls the transfer of the predetermined program to RAM 7 from the second area to be accessible from CPU 2 in the normal mode (S5). Although not particularly limited, CPU 2 is set to the sleeping condition during the data transfer operation with DTC 3.

Upon completion of the transfer operation, DTC 3 requests the predetermined interruption (S6) and CPU branches, in response to this request, the instruction execution process to the process to execute the program transferred to RAM 7 from the second area 22 (S7).

Figure 12:
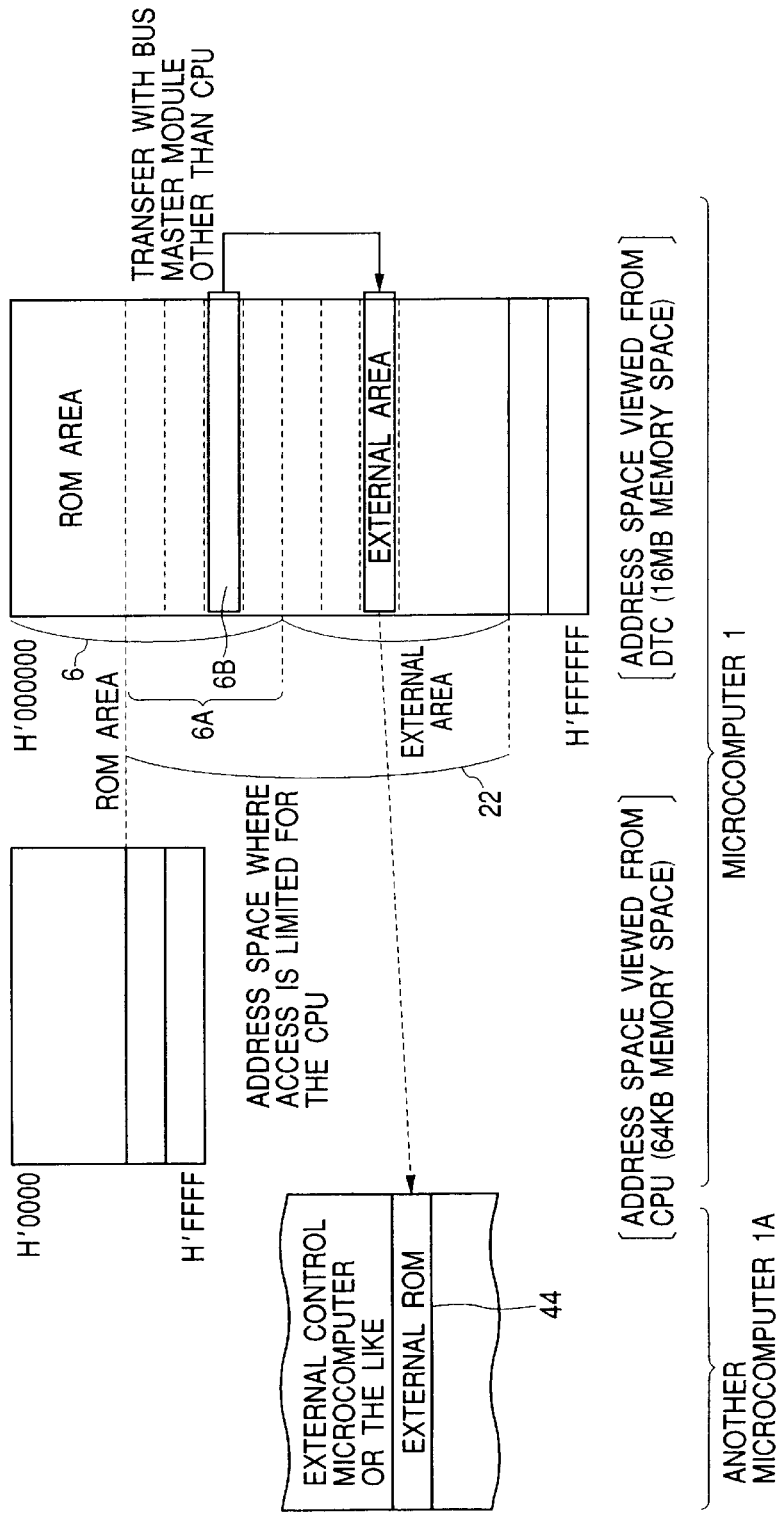
FIG. 12 is an address map for explaining operation of the data processing system of FIG. 11.

According to the microcomputer 1, even when the program is, for example, generated exceeding the limitation of program capacity for the access range of CPU 2 in the normal mode, if the program exceeding such limitation is stored previously in the non-access area 6A (refer to FIG. 12) of ROM 6, CPU 2 cannot made access in direct to the programs stored in the non-access area 6A of the relevant ROM 6. However, DTC 3 can make access in the DTC expansion mode in the normal mode and then transfers the data to RAM 7 and thereby CPU 2 in the normal mode can use, by making access, the program transferred to RAM 7. Therefore, while the execution efficiency of program is maintained in the good condition with the comparatively small access space of CPU 2, the limitation of the program capacity can be alleviated.

Moreover, when the control bit DTV of register 30 is set to the logical value "0", CPU 2 and DTC 3 can access only to the address space of the normal mode in this mode. Thereby, the operation profile similar to that of the microcomputer can also be realized and the existing operating program operated in such condition can be assured for execution in direct to realize compatibility to the existing microcomputer.

Data Processing System

Figure 6:
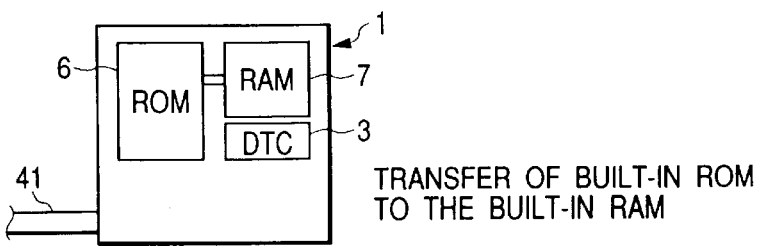
FIG. 6 is a block diagram illustrating the first example of the data processing system using the microcomputer of FIG. 1.

FIG. 6 illustrates a first example of the data processing system using the microcomputer 1. A plurality of exclusive signal buses 41 for connecting the built-in peripheral circuit of the microcomputer are connected to the I/O ports IOP1 to IOP5 of the microcomputer. In the system illustrated in this figure, in the normal mode, DTC 3 transfers the information of the second area of ROM not accessed from CPU 2 to RAM 7 by making use of the DTC expansion mode in the normal mode to use CPU 2.

For example, when the microcomputer 1 is started in the normal mode, CPU 2 cannot access the second area of ROM 6. Here, it is assumed that a plurality kind of program modules and data are stored in the manufacturing stage of the microcomputer or on the system in the second area 22 of ROM 6. Thereafter, when CPU 2 sets the control bit DTV of the control register 30 to the logical value "1", while DTC 3 obtains the bus right (DTCACKN=0), the DTC expansion mode can be attained in the normal mode and DTC 3 can transfer the data or program to RAM 7 from the non-access area 6A of ROM not accessed only in the normal mode.

Figure 7:
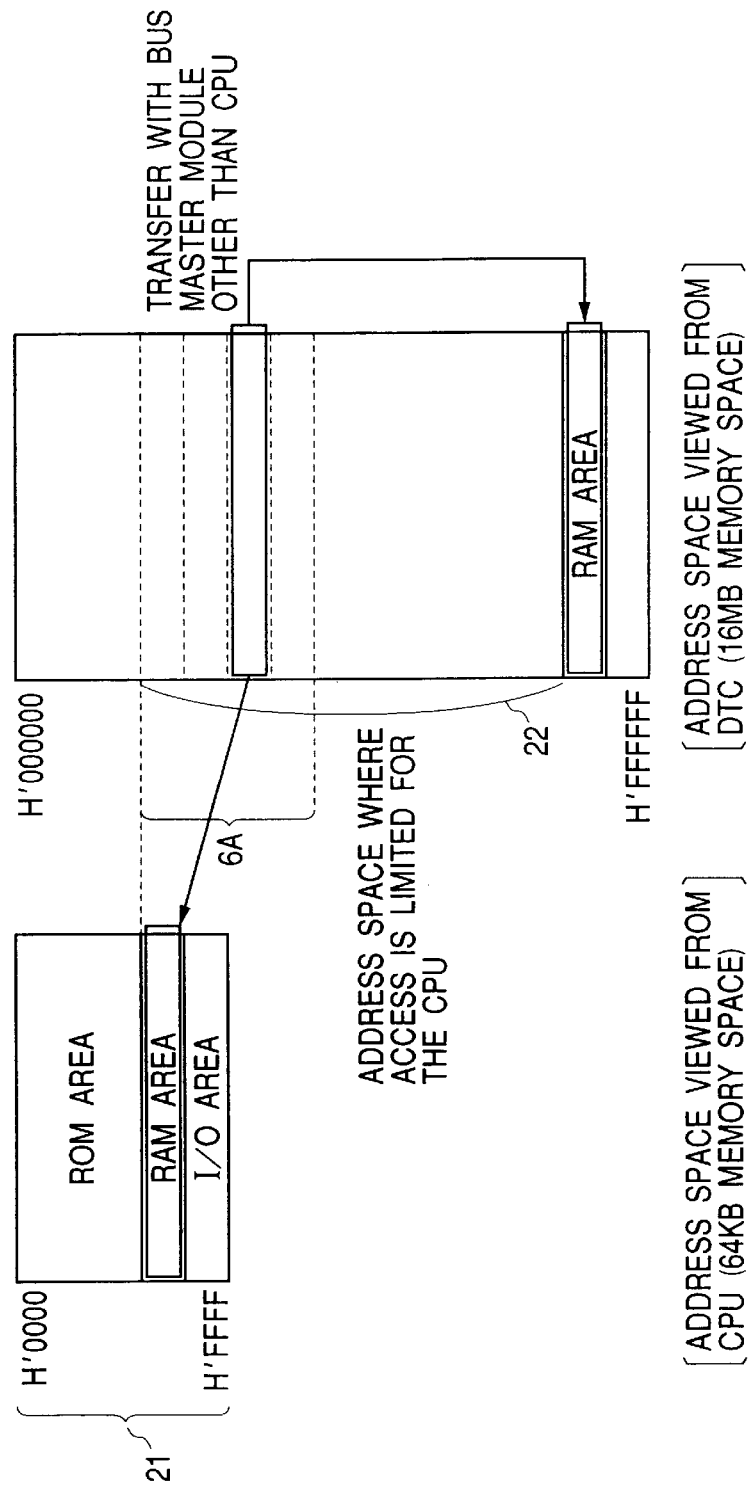
FIG. 7 is an address map indicating the concept of the address space viewed from CPU and the address space viewed from DTC in the DTC expansion mode in the normal mode of the data processing system.

FIG. 7 illustrates the concept of the address space viewed from CPU 2 and the address space viewed from DTC 3 in the DTC expansion mode in the normal mode of the data processing system of FIG. 6. As illustrated in FIG. 7, the data or program is transferred to RAM 7 from the second area 2 with DTC 3 and thereafter when CPU 2 obtains the bus right, CPU 2 can use the data or program transferred to RAM 7.

Figure 8:
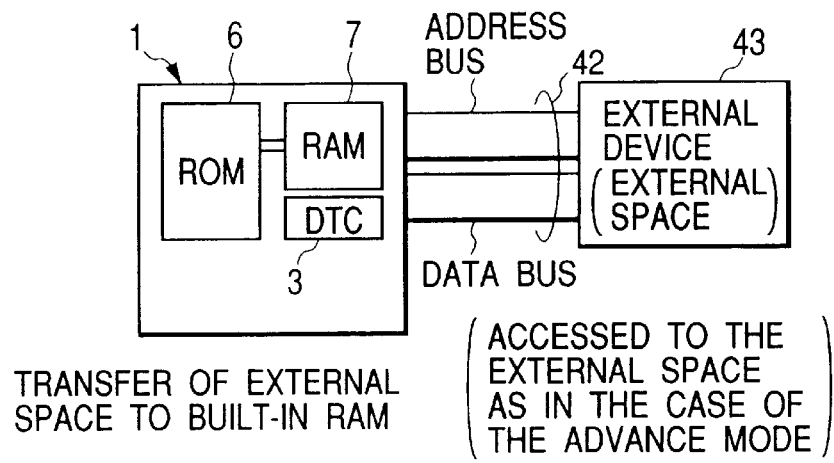
FIG. 8 is a block diagram illustrating the second example of the data processing system using the microcomputer of FIG. 1.

FIG. 8 illustrates the second example of the data processing system using the microcomputer 1. The external bus 42 including the address bus and data bus is connected to the I/O ports IOPA to IOPF of the microcomputer and the external bus 42 is connected with the external device 43 such as memory and peripheral circuit. The external device 43 forms the external area in the advance mode of FIG. 3.

In the system of FIG. 8, DTC 3 transfers the information stored in the external device 43 on the second area 22 not accessed from CPU 2 in the normal mal to RAM 7 to enable use of CPU 2 by utilizing the DTC expansion mode in the normal mode and moreover DTC 3 transfers the data of RAM 7 to the external device 43 on the second area using the DTC expansion mode in the normal mode. Otherwise, CPU 2 can be used when DTC 3 transfers the data transferred to the microcomputer 1 from the external device to RAM on the second area using the DTC expansion mode and then transfers such data to RAM 7 in response to the request from CPU 2. On the contrary, DTC 3 can transfer the data output on RAM 7 by CPU 2 to RAM on the second area 22 and then transfer the data to the external device 43 connected to the microcomputer 1.

Figure 9:
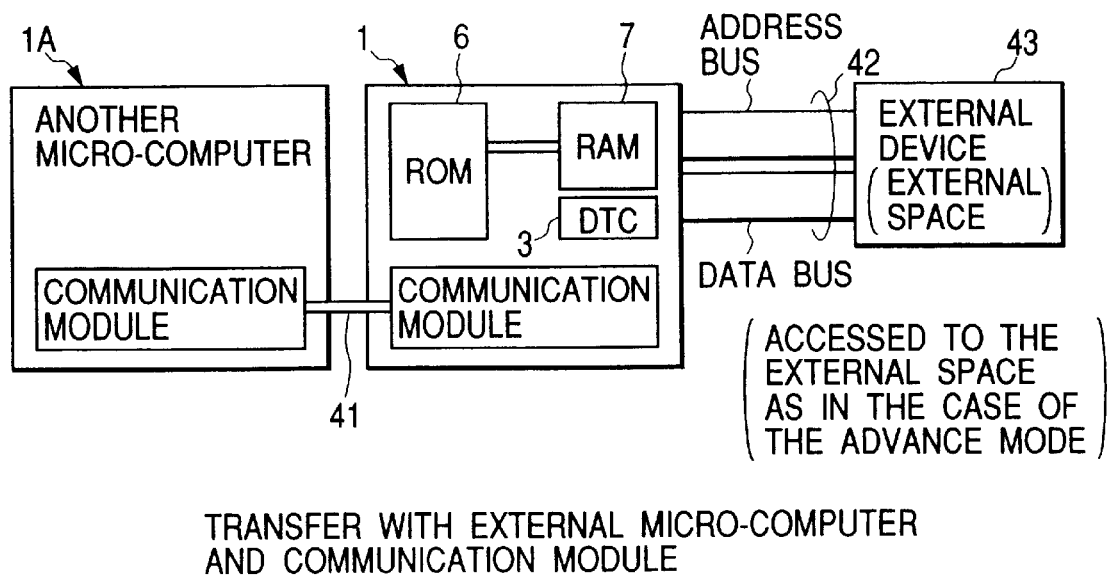
FIG. 9 is a block diagram illustrating the third example of the data processing system using the microcomputer of FIG. 1.

FIG. 9 illustrates the third example of the data processing system using the microcomputer 1. In this example, the external bus 42 is connected with the external device 43, while the exclusive signal bus 41 is connected with the other microcomputer 1A.

In the data processing system illustrated in FIG. 9, DTC 3 can transfer the information of external device 43 and ROM 6 on the second area 22 not accessed from CPU 2 in the normal mode of the microcomputer 1 to the I/O register of communication modules such as SCI 11 using the DTC expansion mode in the normal mode, and DTC 3 can also transfer the data of I/O register of the communication module of the microcomputer 1 to the second area 22. Therefore, for example, when the microcomputer 1 and another microcomputer 1A are capable of executing the data transmission or data communication via the communication module such as SCI, the microcomputer 1 is capable of executing the virtual data communication between the second area 22 not accessed in the normal mode and the other microcomputer 1A.

For example, when the microcomputer 1 is started in the normal mode, CPU 2 cannot access the external device 43 and the second area 22 of ROM 6. It is assumed that a plurality of program modules and data are stored previously in the manufacturing stage of microcomputer on the system in this second area 22 of ROM 6. Thereafter, when CPU 2 sets the control bit DTV of the control register 30 to the logical value "1", if DTC 3 obtains the bus right (DTCACKN=0), the DTC expansion mode in the normal mode is attained and DTC can transfer data or program to the I/O register in the I/O space from the external device or second area 22 of ROM 6 that cannot be accessed only in the normal mode.

Figure 10:
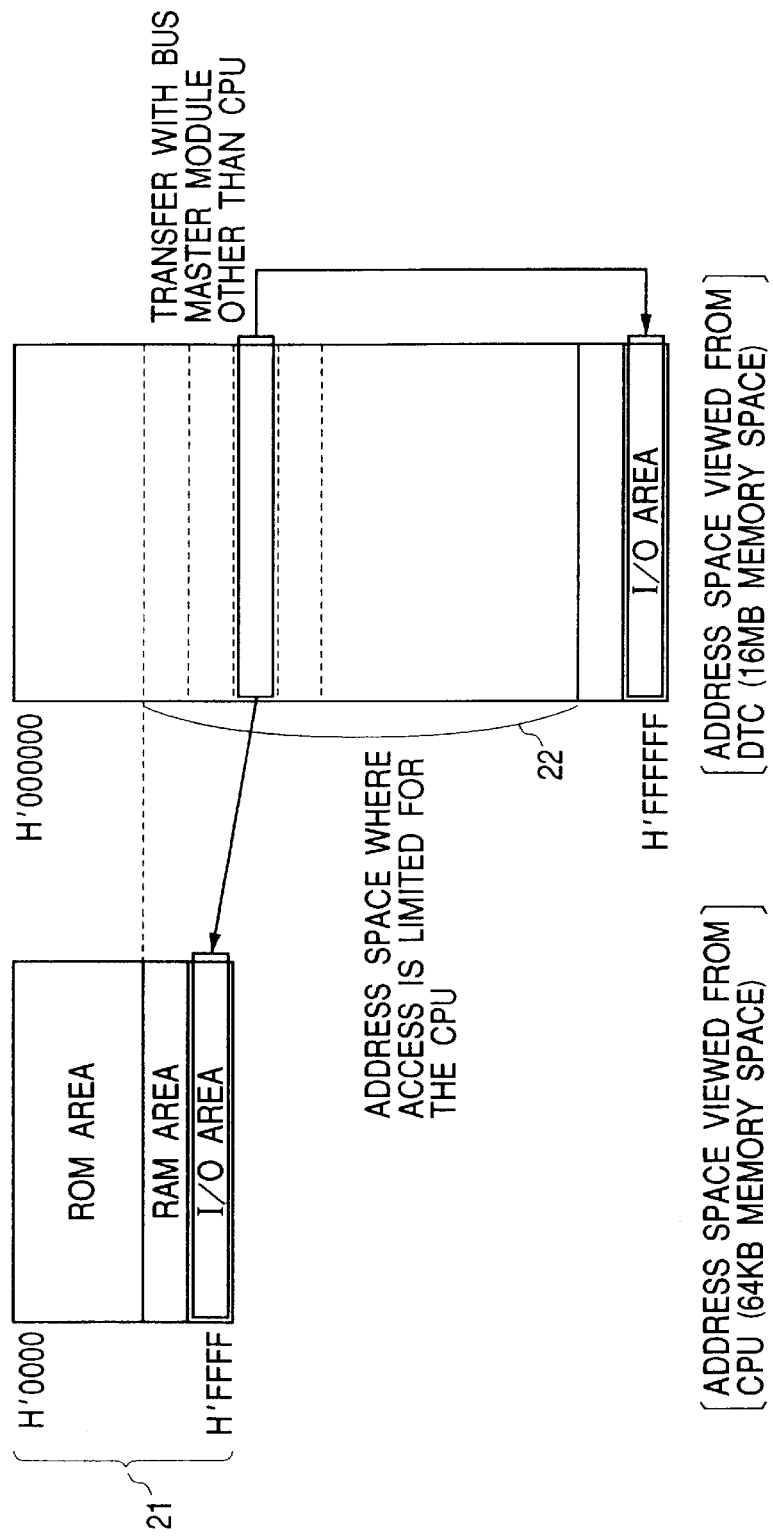
FIG. 10 is an address map illustrating the concept of the address space viewed from CPU and the address space viewed from DTC in the DTC expansion mode in the normal mode of the data processing system.

FIG. 10 illustrates the concept of the address space viewed from CPU and the address space viewed from DTC 3 during the DTC expansion mode in the normal mode. As illustrated in FIG. 10, data or program is transferred to the I/O register from the second area 22 from DTC 3 and thereafter the communication module such as SCI can transmit the data or program transferred to the I/O register to the other microcomputer 1A.

Figure 11:
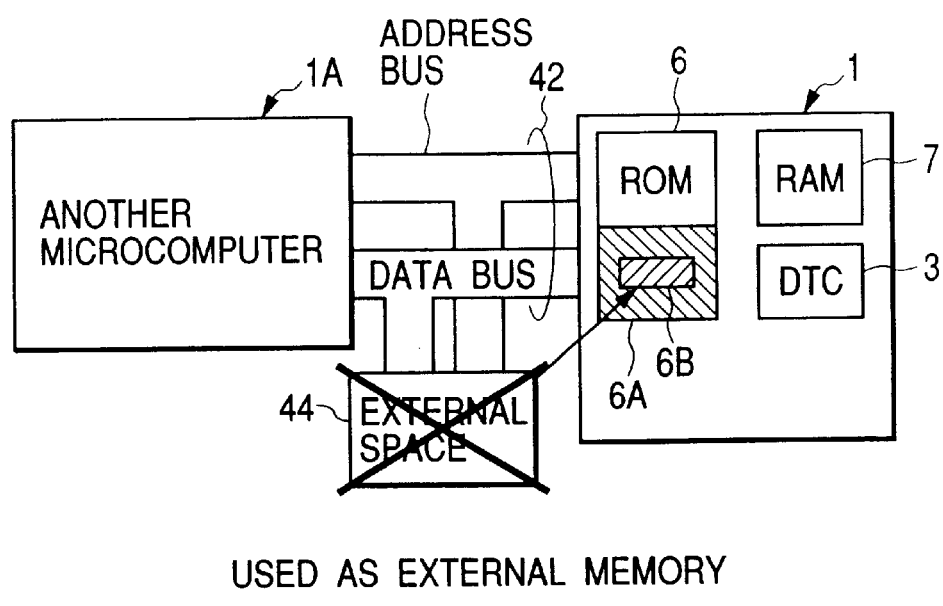
FIG. 11 is a block diagram illustrating the fourth example of the data processing system using the microcomputer of FIG. 1.

FIG. 11 illustrates the fourth example of the data processing systems using the microcomputer 1. The data processing system illustrated in the same figure utilizes the non-access area 6A of ROM 6 included in the second area 22 as the non-access object area in the normal mode of the microcomputer 1 as the external memory of the other microcomputer 1A. Namely, the external memory 44 for the other microcomputer 1A is abolished to the external bus 42 connected to the other microcomputer 1A, and the non-access area 6A of ROM 6 is virtually used, in place of such external memory 44, as the external memory of the other microcomputer 1A. As the practical control method for this purpose, CPU 2 of the microcomputer 1 causes, in synchronization with the access, if generated, to the memory 44 being abolished from the other microcomputer 1A, DTC 3 to execute the data transfer process in response to the access of the other microcomputer 1A by utilizing the DTC expansion mode in the normal mode. In regard to the correspondence between the access address of the memory 44 in the address space of the other microcomputer 1A and the address of non-access area 6A of ROM 6, CPU 2 previously attains such correspondence, for example, and CPU 2 refers to such correspondence relationship for setting the transfer control condition to DTC 3.

The practical example of the data processing system of FIG. 11 will then be explained in detail. The data processing system of FIG. 11 comprises the microcomputer 1 and the other microcomputer 1A that can access the memory respectively and are connected to the common bus 2.

In the normal mode of the microcomputer 1, when the particular process command is given in association with the control data from the other microcomputer 1A, CPU 2 assigns, in response to the first request of the relevant command, the entire part or a part of the area (third area) of the non-access area 6A of ROM 6 to the storage area of the other microcomputer 1A. Namely, the other microcomputer obtains the correspondence between the address of the third area 6B of ROM 6 and the memory access address of the other microcomputer 1A (in other words, the address with which the other microcomputer can map the memory 44).

Thereafter, the other microcomputer 1A issues the second request, for example, the write access assuming the memory 44 of the other microcomputer 1A, CPU 2 converts the write address to the address of third area 6B by referring to the correspondence relationship in response to such write access request, then sets such address as a transfer condition to the transfer control information area 7A of RAM 7 and causes DTC 3 to transfer the write data to the third area in the timing synchronized with the write access cycle of the other microcomputer 1A.

Moreover, when the other microcomputer 1A issues the third request, for example, the read request assuming the memory 44, CPU 2 converts, in response to such request, the read address to the address of third area 6B by referring to the information of the correspondence relationship, sets this address as one of the transfer condition to the transfer control information area 7A of RAM 7 and causes DTC 3 to transfer the data to the other microcomputer 1A from the third area 6B in the timing synchronized with the read access cycle of the other microcomputer 1A.

According to the data processing system of FIG. 11, the entire part or a part of the third area 6B of the non-access area 6A of ROM 6 that is the non-access object area by the built-in CPU 2 of the microcomputer 1 can be used as the memory 44 of the other microcomputer 1A as the second data processor, in the normal mode (second mode) of the microcomputer 1 as the first data processor.

It is possible to store the information used by the microcomputer 1 to the part other than the third area 6B in the non-access area 6A of ROM 6 by CPU 2 in the normal mode or to transfer the data used by the microcomputer 1 to RAM 7 from the part other than the third area 6B of the non-access area 6A of ROM 6.

According to the data processing system, it can give much contribution to reduction in physical size of the circuit of the data processing system in such points that ROM 6 built in the relevant microcomputer 1 can be used effectively in the normal mode of microcomputer 1 and moreover ROM 6 built in the microcomputer 1 can be used as the memory of the other microcomputer 1A in the normal mode. Therefore, while the data processing efficiency by the normal mode is maintained in the good condition, the limitation on the program capacity can be alleviated to enable high performance of program process and provide efficient measure for complication.

Figure 13:
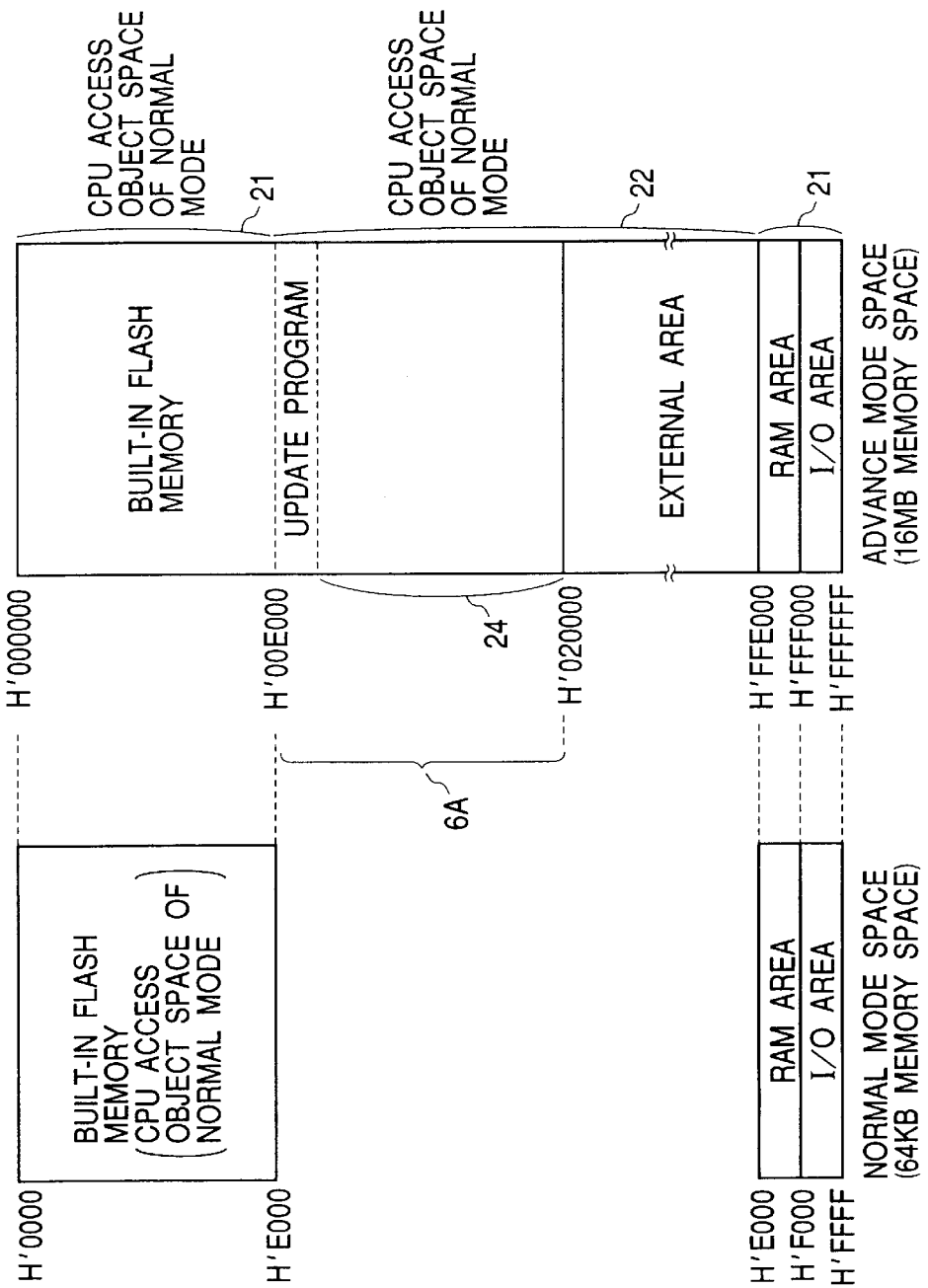
FIG. 13 is an address map of the microcomputer focused on the update of a flash memory when ROM is formed of such flash memory.

FIG. 13 illustrates an example of programming of flash memory when ROM 6 is formed of a flash memory. As ROM 6, an electrically programmable flash memory may be used. When programs are stored in the flash memory, update of program for program correction and version-up for overcoming bug becomes possible by storing the programs in the flash memory. When CPU 2 performs the update control, it is enough when the update control program executed by CPU 2 is stored in the non-access area 6A of the flash memory. At the time of update, CPU 2 in the normal mode initially sets the transfer condition to the transfer control information area 7A of RAM 7 and thereafter DTC 3 transfers, depending on such initial setting, the update control program of the non-access area 6A to the first area 21 of RAM 7, and CPU 2 controls the update of the flash memory by executing the update control program.

In FIG. 13, it is also possible that the area 24 is used as the other program or data area that is used by CPU 2 by transferring the data in the DTC expansion mode in the normal mode or as the external memory of the other microcomputer 1A explained in FIG. 11.

The inventions proposed by the inventors of the present invention have been explained practically based on the preferred embodiments but the present invention is not limited thereto and allows various changes or modifications within the scope of the appended claims.

For instance, DTC 3 is an example of the transfer controller for the data and when DTC 3 is designed as a circuit module that can be used as the bus master having the data or program transfer control function, the transfer controller may be a built-in bus master module such as a co-processor or the like. Moreover, it may be a bus master module called the direct memory access controller (DMAC). DTC has a structure to read the transfer control condition into the internal register from RAM but the transfer controller is allowed to provide a plurality pairs of transfer control registers depending on the number of transfer channels like DMAC.

Moreover, kinds of built-in module of the data processor are not limited to above explanation and it is also possible to form the data processor including various functions by adding or deleting the circuit module adequately.

Practical contents of address map and operation mode corresponding to the operation mode of the data processor can be changed adequately. In the case of mapping the external space even in the normal mode, it is also possible to invalidate the built-in ROM in the expansion mode.

In addition, in the explanation about FIG. 11, CPU converts the write address and read address to the address of third area by referring to the information about the address correspondence relationship but it is also possible, on the contrary, that the other microcomputer 1A supplies the data to the microcomputer 1 through the address conversion. In this case, DTC 3 uses the address signal supplied in direct as the transfer control condition.

Moreover, in above explanation CPU and DTC use exclusively the bus connected on the same bus, but it is also possible that CPU and DTC are connected respectively to different buses and these buses are connected with the bus controller. In this case, if both buses are isolated, DTC can access the second area independent of CPU and particularly it is effective in the system illustrated in FIG. 8, FIG. 9 and FIG. 11.

The effects of typical inventions of the present specification are as follow.

Namely, even in the second operation mode such as normal mode, the data transfer controller executes the data transfer control exceeding the address range for access from CPU. Thereby, even if programs are generated exceeding the limit of program capacity for the access range of CPU in the second mode, when the program element exceeding such limit is stored in the memory other than the first area, CPU cannot access in direct the programs stored in the memory other than the first area but the transfer controller access such program to transfer it to the first area of the memory and thereby CPU of the second mode can use such program transferred to the first area by making access thereto. Accordingly, while the program execution efficiency is kept in the good condition with the comparatively small address space of CPU, limitation of the program capacity can be alleviated.

When the structure to allow the operation mode for enabling the transfer control exceeding the address space of CPU depending on the setting condition of the register means is introduced, CPU and transfer controller can assure the condition to access the same address space in the second mode, operation mode similar to that of the existing data process can be realized, the existing operation program operated in such condition can be executed in direct and compatibility for the existing data processor can easily attained.

In such a case that an external bus interface circuit that can interface with an outside is further provided in the data processor and the external circuit connected to the external bus interface is assigned to the second area, the transfer controller can use, in the second mode, CPU by transferring the data or program of the external circuit not accessed from CPU to the first area.

When an input/output peripheral circuit that can interface with the external circuit is further provided in the data processor and the I/O register arranged in the first area is provided in the input/output peripheral circuit, the transfer controller transfers, in the second mode, the data of second area not accessed from CPU, to the I/O register of the first area. When CPU controls the input/output operation of the input/output peripheral circuit, it is now possible to transmit the data in the second area to the external circuit via the peripheral circuit.

When an electrically programmable flash memory is used as ROM and programs are stored therein, program update for program correction and version-up as a measure for bug can be realized. When the data processor executes the update control, if the update control program executed by the data processor is stored in the second area of the flash memory, the unnecessary programs can be ruled out from the access area of CPU and the built-in ROM or built-in memory can be used effectively.

The present invention makes much contribution to reduction in size of physical circuit in such a point that the built-in memory of the data processor can be used effectively in the second mode of the data processor and assures high performance of program process by alleviating limitation of program capacity and provides a measure for complication, while maintaining good data processing efficiency in the second mode.

Moreover, in the second mode of the first data processor, the entire part or a part (third area) belonging to the second area as the non-access object memory by the built-in CPU of the first data processor can be used as the memory of the second data processor. The present invention makes, in this point, contribution to reduction in size of physical circuit of the data processing system, alleviates limitation of program capacity, assures high performance of program process, and provides a measure for complication, while maintaining good data processing efficiency in the second mode.

What is claimed is:

1. A data processor comprising:
   a data processing unit;
   a memory; and
   a transfer control unit to selectively set a first mode or a second mode,
   wherein said data processing unit is capable of accessing the entire part of the memory by making access with an address signal having the length of first bits in said first mode and is capable of accessing a first area as a part of the memory through the access with the address signal having the length of second bits that is less than the length of first bits in the second mode,
   wherein said transfer control unit executes a transfer control of information using the address signal having the length of first bits also in the second mode, and
   wherein said transfer control unit in the second mode executes transfer control of information, from the first area of the memory, to a second area other than said first area, in the address space accessed with the address signal having the length of first bits or executes transfer control to said first area of the information stored in the second area.

2. A data processor according to claim 1, further comprising:
   an external bus interface circuit which is capable of interfacing with an external circuit of the data processor,
   wherein the external circuit couples to said external bus interface circuit is assigned to said second area.

3. A data processor according to claim 1, further comprising:
   an input/output peripheral circuit capable of accessing to outside of the data processor,
   wherein said input/output peripheral circuit includes a register arranged in said first area.

4. A data processor, according to claim 1,
   wherein said memory includes a ROM included in said first area and second area, and a RAM included in said first area.

5. A data processor according to claim 4, wherein said ROM is an electrically programmable flash memory.

6. A data processor according to claim 5, wherein said flash memory includes, in said second area, a storage area of an update control program of a flash memory executed with said data processor.

7. A data processor comprising:
   a data processing unit;
   a memory; and
   a transfer control unit to selectively set a first mode or a second mode,
   wherein said data processing unit is capable of accessing the entire part of the memory by making access with an address signal having the length of first bits in said first mode and is capable of accessing a first area as a part of the memory through the access with the address signal having the length of second bits that is less than the length of first bits in the second mode, and
   wherein said transfer control unit executes a transfer control of information using the address signal having the length of first bits also in the second mode,
   a control register that can take a first or second condition, wherein said transfer control unit, in the second mode, executes a first transfer control using the address signal having the length of first bits in response to the first condition of said control register, and also executes a second transfer control using the address signal having the length of said second bits in response to the second condition of said control register, in the second mode.

8. A data processor according to claim 7, wherein said first transfer control enables access to the entire part of said memory and said second transfer control enables access to the first area of said memory, in the second mode.

9. A data processor according to claim 7, wherein said first area includes a transfer control information area in which the transfer control information including transfer source and transfer destination addresses for the transfer control by said transfer control unit, and the plurality of transfer control information are set in said data processing unit, and wherein said transfer control unit receives an instruction to start operation of the data transfer, reads the transfer control information from said transfer control information area and executes the transfer control according to the transfer control information.

10. A data processing system comprising:

a first data processor; and a second data processor that is coupled to a common bus for making access to said first data processor, wherein said first data processor includes a data processing unit, a memory and a transfer control unit to selectively set a first mode or second mode, wherein said data processing unit is capable of accessing the entire part of said memory with an address signal of first bits length in said first mode and also is capable of accessing a first area as a part of said memory with the address signal of second bits length that is less than the bit length of first bits, wherein said transfer control unit executes the transfer control of information using the address signal of first bits also in said second mode, and wherein said data processing unit assigns, in said second mode, a third area included in the area other than the first area of said memory to the storage area of said second data processor in response to a first request from said second data processor, causes said data transfer control unit to transfer the information supplied from said second data processor to the third area in response to a second request from said second data processor, and also causes said data transfer control unit to transfer the information to said second data processor from said third area in response to a third request from said second data processor.

11. A data processing system according to claim 10, wherein said second data processor transfers, together with said first request, area information to identify the storage area of said second data processor assigned to said third area to the first data processor, and wherein said first data processor converts, together with said second request and third request, the address signal output from said second data processor to the address information in said third area using said area information.

12. A data processing system according to claim 11, wherein said area information is at least one of the area size, leading address of area, leading address and trailing address of area or leading address and area size of the area.

13. A data processing system according to claim 12, wherein said data transfer control unit stores the information used by said first data processor to the part other than the first and third area of said memory.

14. A data processing system according to claim 12, wherein said data transfer control unit transfers the data used by the data processing unit to said first area from the part other than the first and third areas of said memory.

15. A data processing system according to claim 10, wherein said second data processor transfers, together with said first request, area information to identify the storage area of said second data processor assigned to the third area to the first data processor, and said first data processor transfers the area information to identify said third area to said second data processor, and wherein said second data processor outputs, to the first data processor, the address signal generated using said area information of said third area in response to said second request or third request.

* * * * *